(12) United States Patent  
McLaughlin

(10) Patent No.: US 7,125,011 B2  
(45) Date of Patent: Oct. 24, 2006

(54) MAGNETIC CUTTING BOARD

(76) Inventor: Kevin William McLaughlin, 462 60th St., Oakland, CA (US) 94609

( * ) Notice: Subject to any disclaimer, the term of this patent is extended or adjusted under 35 U.S.C. 154(b) by 263 days.

(21) Appl. No.: 10/840,887

(22) Filed: May 7, 2004

(65) Prior Publication Data

US 2005/0248075 A1 Nov. 10, 2005

(51) Int. Cl. *B23Q 3/00* (2006.01)
(52) U.S. Cl. .............................. 269/289 R; 269/302.1
(58) Field of Classification Search ............ 269/289 R, 269/302.1, 8
See application file for complete search history.

(56) References Cited

U.S. PATENT DOCUMENTS

| | | | |
|---|---|---|---|
| 3,124,501 A | | 3/1964 | Wise |
| 4,273,318 A | | 6/1981 | Crowhurst |
| 4,305,166 A | | 12/1981 | Rose |
| 4,310,978 A | | 1/1982 | Stern |
| 4,371,169 A | * | 2/1983 | Compton .................... 273/271 |
| 4,971,278 A | | 11/1990 | Woods |
| 5,472,790 A | | 12/1995 | Thompson |
| 5,487,276 A | | 1/1996 | Namisniak |
| 6,302,363 B1 | | 10/2001 | Olson et al. |
| 6,364,126 B1 | | 4/2002 | Enriquez |
| D460,118 S | | 7/2002 | Gray |
| D462,091 S | | 8/2002 | Lowder |
| D468,708 S | | 1/2003 | Gray |
| D468,709 S | | 1/2003 | Harbin |
| 6,889,969 B1 | * | 5/2005 | Diermeier et al. ...... 269/289 R |
| 2002/0195763 A1 | * | 12/2002 | Benjamin ............... 269/289 R |
| 2003/0116001 A1 | * | 6/2003 | Potter ........................ 83/522.1 |
| 2003/0116110 A1 | | 6/2003 | Potter |
| 2005/0248075 A1 | * | 11/2005 | McLaughlin ............ 269/289 R |

FOREIGN PATENT DOCUMENTS

| | | | |
|---|---|---|---|
| EP | 0170060 | * | 5/1986 |
| JP | 4100094490 A | | 9/1996 |
| JP | 410243888 A | | 9/1998 |
| JP | 02002336143 A | | 5/2001 |

* cited by examiner

Primary Examiner—Lee D. Wilson  
(74) Attorney, Agent, or Firm—Sharon J. Adams

(57) ABSTRACT

One or more cutting boards that may be conveniently and compactly stored on many vertical surfaces in the kitchen, for example, a refrigerator. In the preferred embodiment, each cutting board contains two layers, a flexible magnet, and a flexible yet durable cutting surface. One or more of the magnetic cutting boards may be placed on any magnetically attractive surface, whether vertical or horizontal, and will remain in place due to the magnetic attraction between the magnetic cutting board and the magnetically attractive surface.

30 Claims, 3 Drawing Sheets

MAGNETIC CUTTING BOARD

CROSS REFERENCE TO RELATED APPLICATIONS

Not Applicable.

FEDERAL SPONSORSHIP

Not Applicable.

BACKGROUND

If is often convenient, and certainly more sanitary, to have more than one cutting board in the kitchen. Yet, persons working in small kitchens, or those who need to conserve space in the kitchen, frequently are unable to accommodate more than one cutting board.

The present invention relates generally to a flexible yet durable cutting board adhered to a flexible magnet. The cutting board may be stored on any vertical surface to which a magnet is attracted. In addition, a plurality of cutting boards may be stacked on top of each other, to reduce clutter and conserve space.

Persons handling food frequently need to cut different types of food. Using different cutting boards for different foods will protect human health and increase food safety. The present invention allows the user to conveniently and compactly keep one or more cutting boards close at hand.

Efforts have been made to provide compact cutting boards, but have not provided for compact storage of the cutting boards. For example, U.S. Pat. No. 5,472,790 issued to Thompson on Dec. 5, 1995 discloses a single-layer, thin, flexible cutting board. However, this cutting board cannot be conveniently affixed to a vertical surface, and thereby stored. The single-layer cutting board may slip if a plurality of cutting boards are stored horizontally.

Another example, Pat. No. JP02002336143A, issued to Wakahoi on Nov. 26, 2002, discloses a cutting board that may be vertically stored. However, this invention requires a separate iron holder to which a small magnet in the cutting board is attracted.

Another patent, Pat. No. JP410094490A, issued to Yabusaki on Apr. 14, 1998, discloses a magnet placed between two larger layers so that a kitchen knife will be attracted to the magnet and will not slip. However, the additional bottom layer decreases the magnetic attraction on the bottom, and prevents vertical storage. Vertical storage is also hampered because the magnet is smaller than the bottom layer.

U.S. Pat. No. 6,302,363 B1, issued to Olsen et al, on Oct. 16, 2001, discloses two stacked magnets that are permanent affixed to each other, and may not be separated. In addition, the magnets are not flat, and could not be used as a cutting board.

None of the prior patents adequately allow for the convenient and compact storage of multiple cutting boards.

SUMMARY OF THE INVENTION

There are many national and international guidelines regarding safe and sanitary means for cutting and handling food. These guidelines suggest that persons handling food use a different cutting board for different foods. This can be difficult to accomplish in small kitchens, and storage of multiple cutting boards can pose problems even in larger kitchens.

The present invention is directed toward providing one or more cutting boards that may be conveniently and compactly stored on many vertical surfaces in the kitchen. Each cutting board contains two layers; the bottom layer being a magnet, and the upper layer being a durable cutting surface.

The upper layer can be made from any available substrate that is durable enough to withstand being cut by a knife blade. In the preferred embodiment, the upper layer will be flexible enough to allow the cutting board to be curved so that food may be more easily transported. The bottom layer is made from a magnet. In the preferred embodiment, the magnet is a flexible magnet and is co-extensively adhered to the upper layer to form a unitary body.

In order to preserve space in the kitchen, a one or more of the magnetic cutting boards may be placed on top of each other, and stored either vertically or horizontally. Each magnetic cutting board will remain in place due to the magnetic attraction between the magnetic cutting board and the magnetically attractive surface or another underlying magnetic cutting board.

The national and international food safety guidelines also recommend color-coded cutting board for five different food groups: blue for seafood; green for vegetables; red for meat; yellow for poultry; and white for fruit. The magnetic cutting boards may come in different colors so that different food groups may be consistently cut on the same cutting board, preventing cross-contamination and improving food safety. The magnetic cutting board also may come in any variety of shapes and sizes. In addition, the durable layer may be imprinted with any variety of graphic designs, to enhance the attractiveness of the magnetic cutting board.

DETAILED DESCRIPTION OF THE INVENTION

Figure 1:
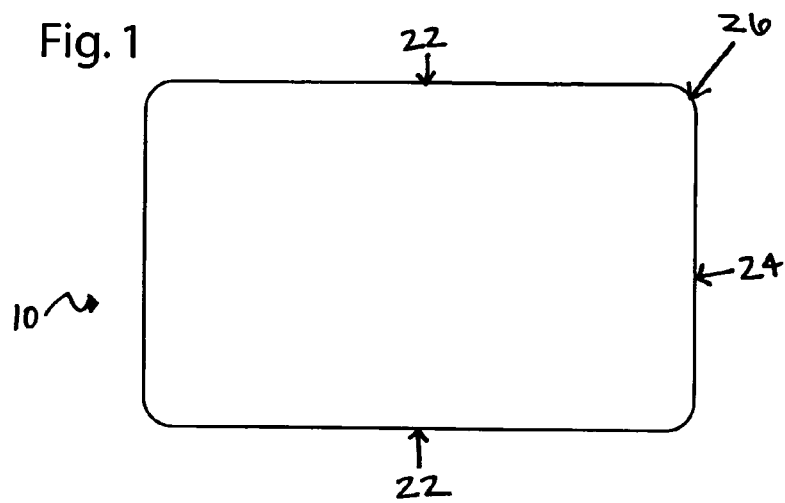
FIG. 1 is a plan view of the magnetic cutting board.

Referring now to the drawings, FIG. 1 shows a top plan view of the magnetic cutting board 10, showing upper layer 12. Upper layer 12 is preferably made from high-density polyethylene or low-density polyethylene. It should be understood that upper layer 12 may be made from any strong and preferably flexible material, for example leather, polypropylene, or other plastic material. Upper layer 12 is preferably flexible, however, is may be made from rigid material, as well.

Upper layer 12 is required to facilitate using the invention with kitchen knives. Upper layer 12 must be sufficiently durable to withstand repeated exposure to knife blades. However, upper layer 12 should not be so hard as to quickly dull knife blades. A cutting board made, for example, solely from a flexible magnet would quickly dull a knife. In addition, upper layer 12 must be sufficiently lightweight so that magnetic cutting board 10 will remain in place on vertical surfaces due to magnetic attraction.

Figure 3:
FIG. 3 is a perspective view showing the flexible magnetic cutting board.

FIG. 1 shows magnetic cutting board 10 in a generally rectangular shape with longer edges 22 and shorter edges 24. FIG. 1 shows magnetic cutting board 10 with curved corner edges 26. As shown in FIG. 3, magnetic cutting board 10 may also have square corners.

Figure 2:
FIG. 2 is a side elevation view of the magnetic cutting board.

FIG. 2 shows upper layer 12 co-extensively affixed to magnetic layer 14. Upper layer 12 and magnetic layer 14 are preferably affixed to each other using pressure sensitive adhesive, although many other methods may use used. For example, upper layer 12 and magnetic layer 14 may be affixed to each other using thermo-bonding, chemical welding, or any other form of adhesive. In addition, upper layer 12 and magnetic layer 14 may be thermoformed to form a magnetic cutting board of any desired shape.

The preferred method for manufacturing the magnetic cutting boards is to begin with sheet or rolled stock of the flexible, durable material and sheet or rolled stock of the flexible magnet. The two sheets are laminated, preferable with pressure sensitive adhesive, and die cut.

Magnetic layer 14 is preferably a flexible magnet, although rigid magnets may be used as well. There are many types of flexible magnets available, for example flexible magnet 14 may be resinous plastic such as polystyrene, polypropylene, acrylic, or the like, having finely divided magnetic: particles distributed throughout the body. Flexible magnet 14 may be single-poled or preferably multi-poled. Single-poled magnets are magnets in which one side has a "north" magnetic attraction and the other side has a "south" magnetic attraction. These single-poled magnets tend to repel each other if, for example, the "south" sides of two magnets are placed adjacent to each other. Multi-poled magnets, on the other hand, contain both "north" and "south" poles on a single side of the magnet. Multi-poled magnets have stronger magnetic attraction per weight than single-poled magnets due to the complex magnetic field generated by the multiple poles. Therefore, multi-poled magnets can be lighter than single-poled magnets and still generate a strong magnetic attraction. In addition, multi-poled magnets will not magnetize adjacent objects.

In the preferred embodiment, magnetic layer 14 is co-extensive with upper layer 12. However, magnetic layer 14 may cover less than all of the bottom surface 28 of upper layer 12. Magnetic layer 14 must be of sufficient size and magnetic attraction so that magnetic cutting board 10 may be vertically affixed to a vertical, magnetically-attractive surface 16, as shown in FIG. 5.

In the preferred embodiment upper layer 12 and magnetic layer 14 are flexible so that food may be easily transported on the cutting board. After cutting food on the magnetic cutting board the cut food may be transported on the cutting board to, for example, a cooking pot. As shown in FIG. 3, cutting board 10 is sufficiently flexible so that it may be bowed to prevent spillage during food transport and to allow the cut food to easily slid into the cooking pot.

Figure 4:
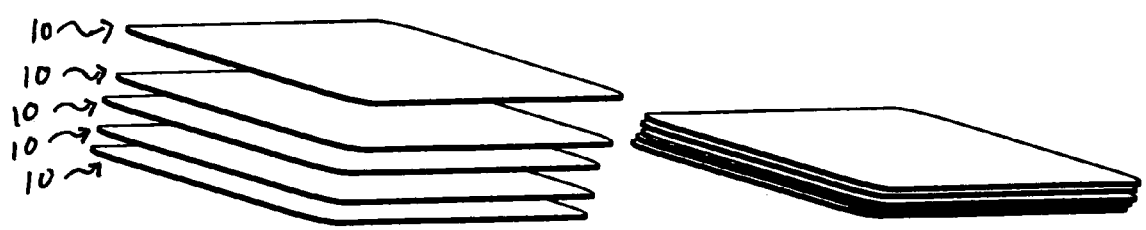
FIG. 4. is a side perspective view of the magnetic cutting boards shown separated and stacked.

As shown in FIG. 4, the magnetic cutting boards may be stacked on top of each other for convenient and compact storage. The use of multi-poled magnets facilitates stacking the magnetic cutting boards. Because the multi-poled magnets are self-aligning the magnetic cutting boards may be placed on top of each other, will remain in place, and will not repel each other due to the multi-poled magnets.

Figure 5:
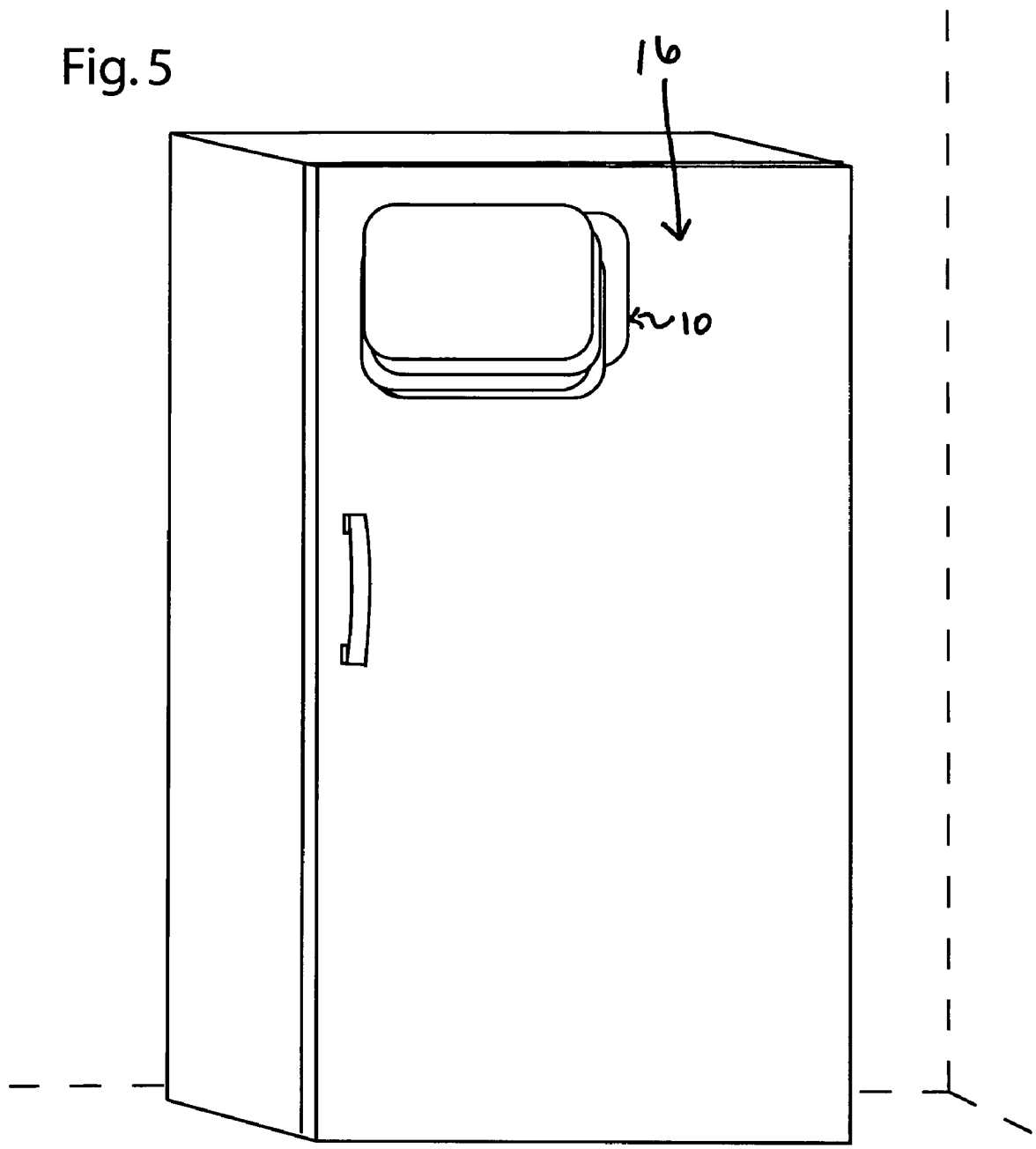
FIG. 5 is a perspective view of five magnetic cutting boards on a vertical surface.

FIG. 5 shows a stack of magnetic cutting boards 10 on a vertical surface, 16. In FIG. 5, the vertical surface is a refrigerator. However, vertical surface 16 may be any vertical surface to which magnets are attracted, for example, an oven, dishwasher, or microwave. The magnetic cutting boards may also be stored without slippage on metal countertops. FIG. 5 shows a stack of five magnetic cutting boards. It should be apparent that five cutting boards are shown as an example only, and that one or more cutting boards may be magnetically attracted to vertical surface 16.

Figure 6:
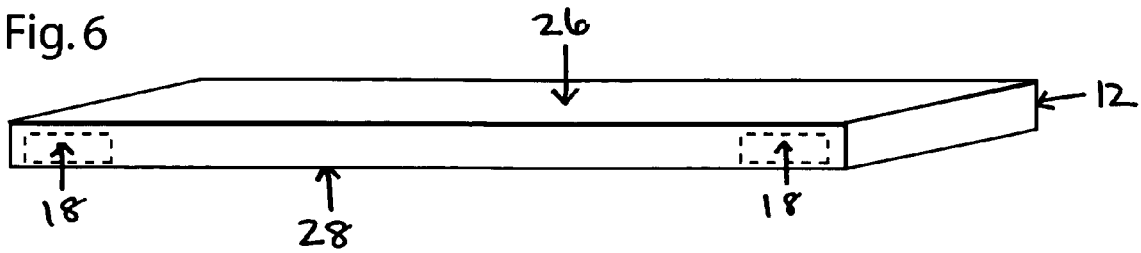
FIG. 6 is a side perspective view of an embodiment of the invention.

FIG. 6 shows another embodiment of the invention. Upper layer 12 has both a top surface 26 and a bottom surface 28. In this embodiment, a plurality of magnets 18 are embedded in the bottom surface 28 of upper layer 12 so the magnets 18 and bottom surface 28 are flush. Magnets 18 must be of sufficient size and/or quantity to allow both vertical and horizontal stacking of magnetic cutting boards 10. Magnets 18 may be rigid or flexible magnets and may be placed in any position in upper layer 12.

Figure 7:
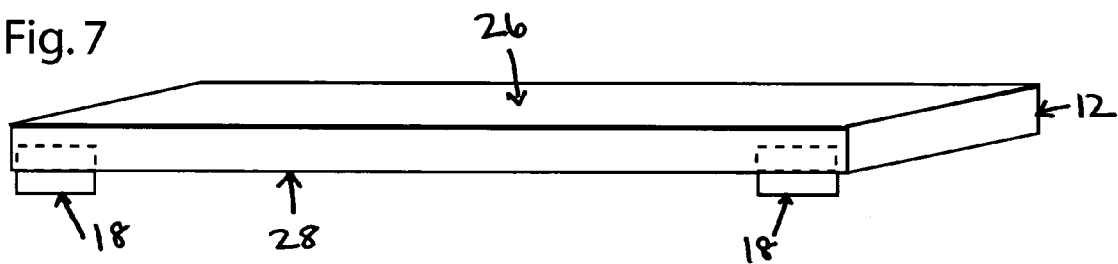
FIG. 7 is a side perspective view of an embodiment of the invention.

FIG. 7 shows another embodiment of the invention. In this embodiment, magnets 18 are embedded in bottom surface 28 of upper layer 12 so that the magnets 18 protrude from bottom surface 28. Magnets 18 must be of sufficient size and/or quantity to allow both vertical and horizontal stacking of magnetic cutting boards 10. Magnets 18 may be rigid or flexible magnets and may be placed in any position in upper layer 12.

Figure 8:
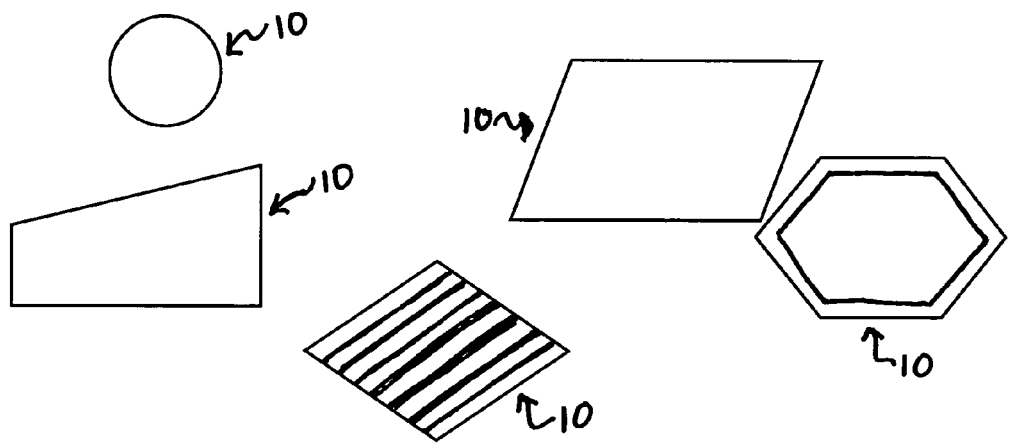
FIG. 8 is a plan view of different embodiments of the invention.

The invention may be made in any variety shapes or sizes, and may have different colors or graphic designs on top surface 26, as shown in FIG. 8. One embodiment will have a stack of five magnetic cutting boards in each of the five colors recommended by the national and international food safety guidelines: blue for seafood; green for vegetables; red for meat; yellow for poultry; and white for fruit. Other embodiments will have a stack of two, three or more magnetic cutting boards with a variety of colors or designs. Alternatively, a stack may contain a plurality of cutting boards with the same color or design to complement the color or design of the kitchen. Also, the stack could contain, for example, a plurality of football shaped cutting boards with a football design for tailgate parties. It should be apparent that the magnetic cutting boards may come in a stack of any number, shape, color, or design.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A set for cutting and handling food comprising
a plurality of magnetic cutting boards wherein
each magnetic cutting board comprises a flat, durable layer co-extensively adhered to a flat, multi-poled magnetic layer and wherein
each of the flat, multi-poled magnetic layers has sufficient magnetic strength to removably stack the magnetic cutting boards on a magnetically-attractive vertical surface.

2. The set of claim 1 wherein each flat magnetic layer is flexible.

3. The set of claim 1 wherein each flat, durable layer is rigid.

4. The set of claim 1 wherein each flat, durable layer is flexible.

5. The set of claim 1 wherein each flat, durable layer is high-density polypropylene.

6. The set of claim 1 wherein each flat, durable layer is low-density polypropylene.

7. The set of claim 1 wherein the plurality of magnetic cutting boards contains a variety of colors.

8. The set of claim 7 wherein the plurality of magnetic cutting boards consists of five magnetic cutting boards, one colored red, one colored blue, one colored green, one colored yellow, and one colored white.

9. The set of claim 7 wherein each of the magnetic cutting boards is the same color.

10. The set of claim 1 wherein each of the magnetic cutting board is rectangular in shape with curved corners.

11. A set for cutting and handling food comprising a plurality of magnetic cutting boards wherein each magnetic cutting board comprises a flat, durable layer with a bottom surface and a top surface, wherein a plurality of flat, multi-pole magnets are embedded in the bottom surface, are flush with the bottom surface, and cover less than all of the bottom surface and wherein each of the flat, multi-poled magnets has sufficient magnetic strength to removably stack the magnetic cutting boards on a magnetically-attractive vertical surface.

12. The set of claim 11 wherein each flat magnet is flexible.

13. The set of claim 11 wherein each of the flat, durable layers is rigid.

14. The set of claim 11 wherein each of the flat, durable layers is flexible.

15. The set of claim 11 wherein each of the flat, durable layers is high-density polypropylene.

16. The set of claim 11 wherein each of the flat, durable layers is low-density polypropylene.

17. The set of claim 11 wherein the plurality of magnetic cutting boards contains a variety of colors.

18. The set of claim 17 wherein the plurality of magnetic cutting boards consists of five magnetic cutting boards, one colored red, one colored blue, one colored green, one colored yellow, and one colored white.

19. The set of claim 17 wherein each of the magnetic cutting boards is the same color.

20. The set of claim 17 wherein each of the magnetic cutting board is rectangular in shape with curved corners.

21. A set for cutting and handling food comprising a plurality of magnetic cutting boards wherein each magnetic cutting board comprises a flat, durable layer with a bottom surface and a top surface, and wherein a plurality of flat, multi-pole magnets are embedded in the bottom surface, protrude from the bottom surface, and cover less than all of the bottom surface and wherein each of the flat, multi-poled magnets has sufficient magnetic strength to removably stack the magnetic cutting boards on a magnetically-attractive vertical surface.

22. The set of claim 21 wherein each flat magnet is flexible.

23. The set of claim 21 wherein each of the flat, durable layers is rigid.

24. The set of claim 21 wherein each of the flat, durable layers is flexible.

25. The set of claim 21 wherein each of the flat, durable layers is high-density polypropylene.

26. The set of claim 21 wherein each of the flat, durable layers is low-density polypropylene.

27. The set of claim 21 wherein the plurality of magnetic cutting boards contains a variety of colors.

28. The set of claim 27 wherein the plurality of magnetic cutting boards consists of five magnetic cutting boards, one colored red, one colored blue, one colored green, one colored yellow, and one colored white.

29. The set of claim 27 wherein each of the magnetic cutting boards is the same color.

30. The set of claim 27 wherein each of the magnetic cutting board is rectangular in shape with curved corners.

* * * * *